United States Patent
Wang et al.

(10) Patent No.: US 12,254,031 B2
(45) Date of Patent: Mar. 18, 2025

(54) METHOD, APPARATUS, ELECTRONIC DEVICE AND STORAGE MEDIUM FOR INTERACTION

(71) Applicant: Beijing Youzhuju Network Technology Co., Ltd., Beijing (CN)

(72) Inventors: Xinyi Wang, Beijing (CN); Bugao Yin, Beijing (CN); Mengmeng Liu, Beijing (CN); Qiang Fu, Beijing (CN); Jiali Hu, Beijing (CN); Zhiyao Xie, Beijing (CN); Jianchao Sun, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/790,620

(22) Filed: Jul. 31, 2024

(65) Prior Publication Data
US 2025/0045312 A1 Feb. 6, 2025

(30) Foreign Application Priority Data

Jul. 31, 2023 (CN) .......................... 202310955905.3

(51) Int. Cl.
*G06F 16/00* (2019.01)
*G06F 16/3332* (2025.01)
(Continued)

(52) U.S. Cl.
CPC ........ *G06F 16/3334* (2019.01); *G06F 16/338* (2019.01); *G06F 16/345* (2019.01)

(58) Field of Classification Search
CPC ............................ G06F 16/338; G06F 16/345
See application file for complete search history.

(56) References Cited

U.S. PATENT DOCUMENTS 9,282,068 B1 * 3/2016 Pan ................. H04L 65/403
2011/0106662 A1 * 5/2011 Stinchcomb .......... G06Q 50/01
715/757

(Continued)

FOREIGN PATENT DOCUMENTS

| CN | 113378058 A | 9/2021 |
| CN | 113905247 A | 1/2022 |

(Continued)

*Primary Examiner* — Cheryl Lewis
(74) *Attorney, Agent, or Firm* — Alleman Hall & Tuttle LLP

(57) ABSTRACT

The present disclosure relates to a method, apparatus, electronic device and storage medium for interaction. The method includes: presenting a target interface including an information flow area and an information input area; in a case that input information to be released is detected in the information input area and the input information satisfies a preset condition, presenting query keyword prompt information; and in response to a triggering operation on the query keyword prompt information, presenting query result content. This is substantially meant that the input information is automatically identified, during the editing of the input information by a user, the input information is converted into the query keyword prompt information for presentation, and in a case that the query keyword prompt information is triggered by the user, the query result content is directly presented, so as to assist the user in quickly obtaining the query result thereof.

20 Claims, 12 Drawing Sheets

Present a target interface comprising an information flow area and an information input area — S110

In a case that input information to be released is detected in the information input area and the input information satisfies a preset condition, present query keyword prompt information — S120

In response to a triggering operation on the query keyword prompt information, present query result content — S130

(51) Int. Cl.
*G06F 16/338* (2019.01)
*G06F 16/34* (2019.01)

(56) References Cited

U.S. PATENT DOCUMENTS

| | | | |
|---|---|---|---|
| 2018/0260481 A1* | 9/2018 | Rathod | G06F 16/958 |
| 2020/0342868 A1* | 10/2020 | Lou | G10L 15/22 |
| 2022/0292593 A1 | 9/2022 | Watfa | |
| 2022/0394344 A1* | 12/2022 | Xie | H04N 21/4788 |
| 2024/0073460 A1* | 2/2024 | Wang | H04N 21/25825 |
| 2024/0171825 A1* | 5/2024 | Xu | H04N 21/472 |

FOREIGN PATENT DOCUMENTS

| | | |
|---|---|---|
| CN | 114780832 A | 7/2022 |
| CN | 115270022 A | 11/2022 |
| CN | 115292600 A | 11/2022 |
| CN | 115767124 A | 3/2023 |
| CN | 116347179 A | 6/2023 |

* cited by examiner

METHOD, APPARATUS, ELECTRONIC DEVICE AND STORAGE MEDIUM FOR INTERACTION

CROSS-REFERENCE TO RELATED APPLICATION(S)

This application claims priority to Chinese Application No. 202310955905.3 filed on Jul. 31, 2023, the disclosure of which is incorporated herein by reference in its entity.

FIELD

The present disclosure relates to a field of interaction technologies, and particularly to a method, apparatus, electronic device and storage medium for interaction.

BACKGROUND

With constant development of video live-streaming, people's demands for functions related to the video live-streaming room are becoming more and more diversified, particularly live-streaming interface presentation manners and presented content closely related to people's experience in viewing the live-streaming.

Therefore, how to meet the user's diversified demands for live-streaming interface presentation to enhance the user's viewing experience is an urgent problem to be solved.

SUMMARY

In order to solve the above technical problems or at least partially solve the above technical problems, the present disclosure provides a method, apparatus, electronic device and storage medium for interaction.

In a first aspect, the present disclosure provides a method for interaction, including: presenting a target interface including an information flow area and an information input area; in a case that input information to be released is detected in the information input area and the input information satisfies a preset condition, presenting query keyword prompt information; and in response to a triggering operation on the query keyword prompt information, presenting query result content.

In a second aspect, the present disclosure further provides an apparatus for interaction, including: a first presentation module configured to present a target interface including an information flow area and an information input area; a second presentation module configured to, in a case that input information to be released is detected in the information input area and the input information satisfies a preset condition, present query keyword prompt information; and a third presentation module configured to, in response to a triggering operation on the query keyword prompt information, present query result content.

In a third aspect, the present disclosure further provides an electronic device, including: one or more processors; and a memory configured to store one or more programs, wherein the one or more programs, when executed by the one or more processors, cause the one or more processors to implement the method for interaction described above.

In a fourth aspect, the present disclosure further provides a computer-readable storage medium storing a computer program thereon, wherein the program, when executed by a processor, implements the above method for interaction.

The technical solutions according to the embodiments of the present disclosure have the following advantages compared with the prior art.

The technical solutions according to embodiments of the present disclosure provides: presenting a target interface including an information flow area and an information input area; in a case that input information to be released is detected in the information input area and the input information satisfies a preset condition, presenting query keyword prompt information; and in response to a triggering operation on the query keyword prompt information, presenting query result content. This is substantially meant that the input information is automatically identified, during the editing of the input information by a user, the input information is converted into the query keyword prompt information for presentation, and in a case that the query keyword prompt information is triggered by the user, the query result content corresponding to the query keyword prompt information is directly presented, so as to assist the user in quickly obtaining the query result thereof.

BRIEF DESCRIPTION OF THE DRAWINGS

The accompanying drawings, which are incorporated in and constitute a part of the description, illustrate embodiments compliant with the present disclosure and, together with the description, are used to illustrate the principles of the present disclosure.

In order to illustrate the embodiments of the present disclosure or the technical solutions in the prior art more clearly, figures to be used to describe the embodiments or the prior art will be introduced below briefly. Obviously, those ordinary skilled in the art may obtain other figures according to these figures without involving any inventive efforts.

DETAILED DESCRIPTION

In order to make the above objectives, features and advantages of the present disclosure more apparent, the solutions of the present disclosure will be further described below. It needs to be appreciated that embodiments and features of embodiments of the present disclosure may be combined with each other without conflict.

Many specific details are set forth in the following description in order to provide a thorough understanding of the present disclosure, but the present disclosure may be practiced otherwise than as specifically described herein. It should be understood that the embodiments in the description are only part of the embodiments of the disclosure, not all of them.

Figure 1:
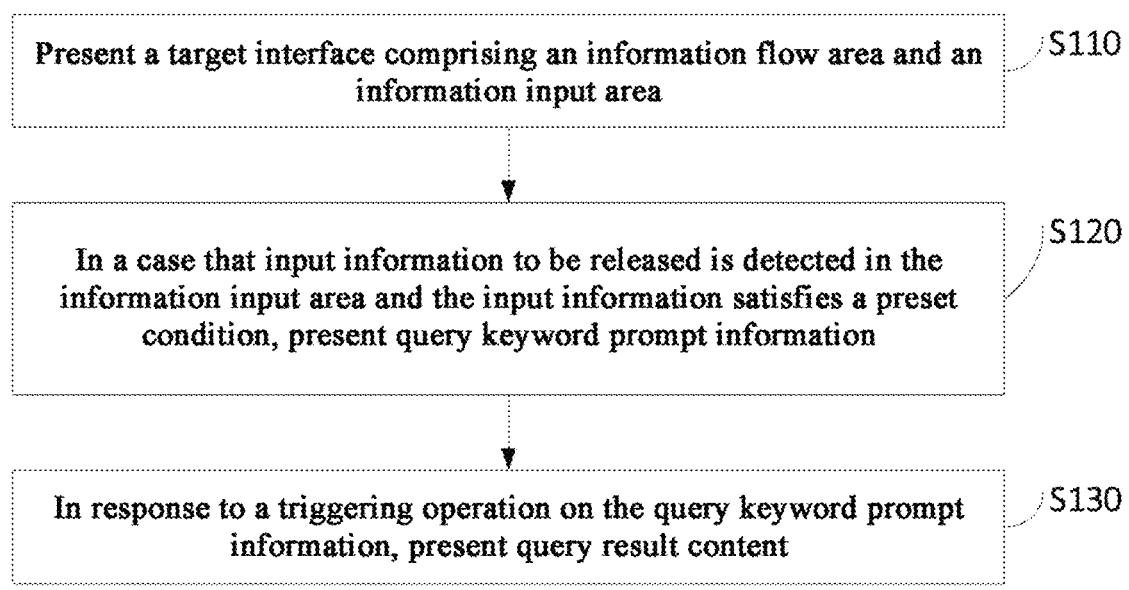
FIG. 1 is a flow chart of a method for interaction according to an embodiment of the present disclosure.

FIG. 1 is a flow chart of a method for interaction according to an embodiment of the present disclosure. The embodiment is applicable for a case in which human-computer interaction is performed in a client terminal. The method may be executed by an apparatus for interaction. The apparatus may be implemented by means of software and/or hardware. The apparatus may be configured in an electronic device, such as a terminal, and specifically include but not limited to a smart phone, a Personal Digital Assistant, a tablet computer, a wearable device with a display screen, a desktop computer, a notebook computer, an all-in-one computer, or a smart home device, etc.

As shown in FIG. 1, the method may specifically include the following steps.

At S110, a target interface including an information flow area and an information input area is presented.

The target interface is a pre-specified interface. The present disclosure does not limit which interface the target interface specifically refers to. Optionally, the target interface may receive input information, and present the information simultaneously.

The information flow area may be, for example, an area for information presentation. Exemplarily, the information flow area is used to present an information flow in an information flow play sequence. The information flow play sequence is a form of data that constantly provides content to a user. The information flow play sequence includes a set of information/content. The set of information/content includes a plurality of pieces of information/content which are sequentially arranged in a certain order to form the information flow play sequence.

The information flow refers to each piece of information/content in the information flow play sequence. The information flow play sequence is a collection formed by a plurality of information flows. Exemplarily, in a case that the information flow play sequence is a set of videos, each video of which is an information flow.

In some embodiments, the types of different information flows in the same information flow play sequence may be the same or different. Types of the information flows may include, but are not limited to, live-streaming preview video, live-streaming video, short video, image-text information, chat information, and the like. The live-streaming preview video may be, for example, a video for attracting traffic for a live-streaming room. The live-streaming video may be, for example, a video reflecting content being broadcast live in the live-streaming room. The short video may be, for example, a short film video. The image-text information may, for example, recommend some content to the user, e.g., recommend an application or recommend an interface mini game, etc. The chat information may be, for example, chat information which the user communicates with others (e.g., customer service personnel, colleagues, friends, etc.).

The information input area may be, for example, an area for receiving input information. The input information is information input by the user though editing.

Optionally, the target interface includes a live-streaming room preview flow interface or a live-streaming room presentation interface. The live-streaming room preview flow interface may be, for example, an interface for playing a live-streaming preview video without entering the live-streaming room. The live-streaming room presentation interface may be, for example, an interface for playing live-streaming video in the case of entering the live-streaming room. The target interface may further be a chat interface where the user communicates with others.

At S120: in a case that input information to be released is detected in the information input area and the input information satisfies a preset condition, query keyword prompt information is presented.

Figure 2:
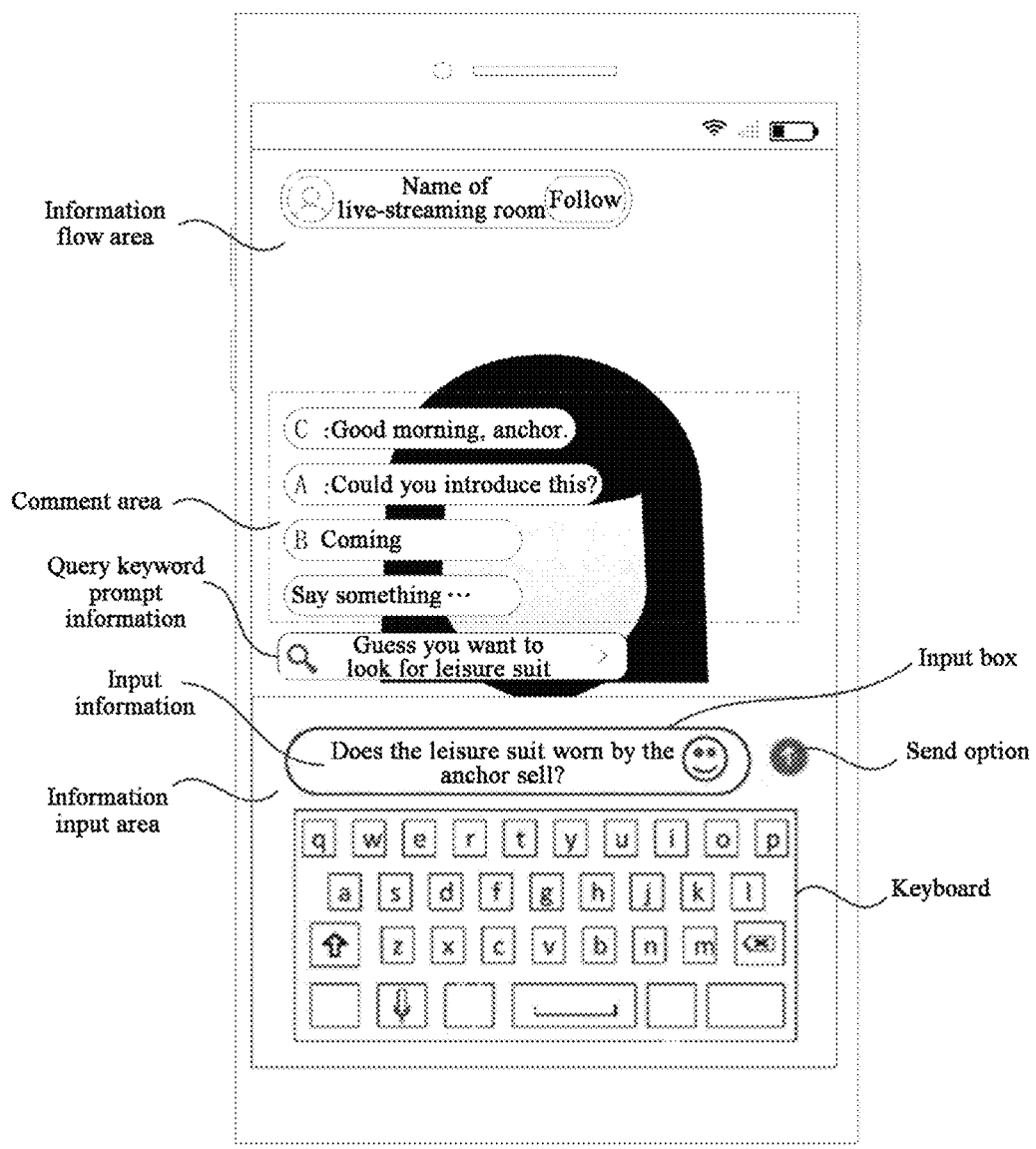
FIG. 2 to FIG. 11 are schematic diagrams of a number of terminal display interfaces according to embodiments of the present disclosure.

When the input information is in a to-be-released state, only the user can view the input information and other people cannot view the input information. Once the input information is released, other people can view the input information. Exemplarily, in a case that the target interface includes the live-streaming room preview steam interface or the live-streaming room presentation interface, after the input information is released, the input information will be converted into comment information, which can be viewed by other users who are watching the live-streaming and the anchor in the live-streaming room. Exemplarily, with reference to FIG. 2, assuming that the target interface is the live-streaming room presentation interface, the information input area includes an input box, a send option and a keyboard, and a user may operate the keyboard to input a text. The input text will be displayed in the input box first. When the user clicks the send option, the text shown in the input box will be shown in the information flow area. In FIG. 2, the text shown in the input box is input information to be released.

In a case that the target interface includes a chat interface, after the input information is released, the input information will be displayed in the information flow area and viewed by the other party of the chat.

The preset condition is a preset judgment condition for determining whether to present the query keyword prompt information related to the input information. The content specifically included in the preset condition is not limited in the present disclosure. Exemplarily, the preset condition includes information on the input information being used for indicating a query for related information of a certain field. Exemplarily, the preset condition includes input information being used for indicating a need to query for related information of a target object.

The object may be a specific real thing or service, or a virtual article. In an E-commerce scenario, the object may be goods, which may specifically be an article or a service or the like. The object includes a plurality of attributes. The attributes of the object may be, for example, features possessed by the object itself due to its construction, or composition, etc. In a case that the object is an article, the attributes of the object include brand, style, size, material, function, trademark, type, price, color, or packaging, etc. In a case that the object is a service, its attributes are the content, brand, attention, price, etc. included in the object. The target object is a subject that the user wishes to query by the input information.

The query keyword refers to a phrase reflecting the core idea of a query purpose. The query keyword may be presented in the form of a text and/or image, etc. The query keyword is obtained by processing the input information. The query keyword prompt information is information composed of one or more query keywords.

Optionally, the input information is used for querying related information of the target object. The query keyword prompt information includes at least one of a query purpose prompt word, a target object identification word and a target object attribute word.

The related information of the target object refers to information having a certain association relationship with the target object, and the association relationship specifically refers to what kind of association relationship, which is not limited in the present disclosure.

The user usually enters the input information in the information input area driven by certain intention. The query purpose prompt word is a word for describing the user's intention to input the input information. In other words, the query purpose prompt word is a word for describing which aspect of the target object the user wishes to query. Exemplarily, in a case that the input information is "does the leisure suit worn by the anchor sell?", the intention of the query is to look for goods, and the query purpose prompt word may be "guess you want to look for". In a case that the input information is "is there a large-size black T-shirt?", the intention of the query is asking for the size, and the query purpose prompt word may be "guess you want to ask".

The target object identification word may be, for example, a word capable of distinguishing the target object from other objects. Exemplarily, the target object identification word is a name, class, or attribute+class, etc. of the target object.

The target object attribute word may be, for example, a word that describes an attribute of the target object.

Optionally, the query keyword prompt information is obtained by parsing the input information and/or the content presented by the target interface. Further, the target object is determined based on the input information and/or the content presented by the target interface.

In one embodiment, the implementation of this step includes: in a case that the input information to be released is detected in the information input area and the input information satisfies the preset condition, obtaining a first question constituent element based on the input information; determining a target time period according to a time when the input information to be released is detected in the information input area; obtaining a second question constituent element based on content presented in the information flow area in the target time period; and generating and presenting the query keyword prompt information based on the first question constituent element and/or the second question constituent element.

The question constituent element is a restrictive precondition provided to obtain an answer to the question. The content specifically included in the first question constituent element and the second question constituent element may be the same or different, and is not limited in the present disclosure. Exemplarily, the first question constituent element includes at least one of a query purpose, a target object and an attribute word; and the second question constituent element includes the target object.

For example, in a case that the input information to be released is detected in the information input area and the input information satisfies the preset condition, intention identification is performed on the input information to obtain a target intention; a query purpose is determined based on the target intention; the input information is segmented to obtain a plurality of reference phrases; the reference phrases are matched with class words in a class word library, and a matched class word is taken as a first class word for describing the class of the target object; the reference phrases are matched with attribute words in an attribute word library to obtain a matched attribute word; and a target object attribute word is obtained based on the matched attribute word. The first class word, the query purpose and the target object attribute word are the first question constituent elements. A target time period is determined according to a time when the input information to be released is detected in the information input area; a reference object name is obtained based on the content presented in the information flow area in the target time period; and the reference object name is matched with each class word in the class word library, and a matched class word is taken as a second class word for describing the class of the target object. The second class word is the second question constituent element. A target object identification word is determined based on the first class word and/or second class word; and the query keyword prompt information is generated and presented based on the query purpose, the target object identification word and the target object attribute word.

There are many methods for performing "intention identification on the input information to obtain the target intention". The methods are not limited herein in the present disclosure. Exemplarily, "performing intention identification on the input information to obtain a target intention" includes: performing natural language processing on the input information to obtain the target intention; or performing intention keyword identification on the input information to obtain an identification result; and determining the target intention based on the identification result. Exemplarily, in a case that the input information includes the intention keyword such as "want to have", "is . . . available", "recommend" or "is there any . . . ", the target intention is determined to be looking for an object, and the query purpose prompt word is determined to be "guess you want to look for".

The class refers to a class of an object. There are multiple class words in the class word library, different class words may be in the same hierarchical relationship or different hierarchical relationship. Exemplarily, all class words in the class word library form a tree structure. Tops and pants both belong to sub-nodes of the garment, and are in the same hierarchical relationship. Tops and garments are in a different hierarchical relationship. In practice, when the tree structure of the class word library includes a plurality of hierarchies, the first class word and/or the second class word may be represented in a chained form. Exemplarily, the first class word that matches the input information may be represented as "garment-tops".

In a case that the time when the input information to be released is detected in the information input area is a first time, the target time period includes the first time. Exemplarily, the target time period is a time period having a duration equal to a preset duration and having the first time as an ending time.

In practice, the first class word might not be obtained based on the input information, but the second class word may be obtained based on the reference object name. In this case, the target object identification word is determined based on the first class word. In practice, it might occur a case in which the first class word may be obtained based on the input information, but the second class word cannot be obtained based on the reference object name. In this case, the target object identification word is determined based on the second class word. In a case that both the first class word and the second class word may be obtained, the priorities of the first class word and the second class word may be preset, for example, the first class word is preferentially used to determine the target object identification word.

The attribute word library includes a plurality of attribute words, and different attribute words may be in the same hierarchical relationship or different hierarchical relationship. Exemplarily, all of the attribute words in the attribute 1 word library form a tree structure. A medium-size and a large-size are both sub-nodes of the size, and the medium-size and the large-size are in the same hierarchical relationship. The medium-size and the size are in a different hierarchical relationship. In practice, when the tree structure of the attribute word library includes multiple hierarchies, the matched attribute word may be represented in the form of a chain. Exemplarily, an attribute word matched with a piece of input information may be represented as "size→large".

In one example, assuming that the user's input information is "I want a large-size quilt cover set for spring and autumn", since the input information includes "want", the query purpose is determined as looking for an object. After the input information is converted, multiple reference phrases are obtained, including "I", "large-size", "large", "spring and autumn", or "quilt cover set", etc. These reference phrases are matched with class words in the class word library respectively, a matched class word is "quilt cover set", and "quilt cover set" is taken as the first class word. The target time period is determined according to the time when the input information is detected; in the target time period, the name of the commodity being introduced by the anchor in the live-streaming room is "all-cotton quilt cover set bedclothes dormitory" (namely, the name of the reference object); the commodity name "all-cotton quilt cover set bedclothes dormitory" is matched with class words in the class word library, the matched class word is "quilt cover set", and "quilt cover set" is taken as the second class word. Since the first class word and second class word are the same, namely, "quilt cover set", the target object identification word is determined as "quilt cover set". These reference phrases are matched with attribute words in the attribute word library respectively; assuming that the matched attribute words "size→large" and "applicable seasons→spring and autumn", "large" and "spring and autumn" are all taken as the attribute words of the target object, the finally-generated query keyword prompt information is "guess you want to look for a quilt cover set for spring and autumn".

In another example, assuming that the user's input information is "what material", the input information is semantically understood to determine that the query aims to query for an attribute. After the input information is converted, multiple reference phrases are obtained, including "what" and "material". These reference phrases are matched with class words in the class word library respectively, no matched class word is found, so the first class word cannot be obtained. The target time period is determined according to the time when the input information is detected; in the target time period, the name of the commodity being introduced by the anchor in the live-streaming room is "a mobile phone case, foldable screen full-package anti-break protection case" (namely, the name of the reference object); the commodity name "mobile phone case, foldable screen full-package anti-break protection case" is matched with class words in the class word library, the matched class word is "mobile phone case", and "mobile phone case" is taken as the second class word. Since there is no first class word, the target object identification word is determined as "mobile phone case" based on the second class word. These reference phrases are matched with attribute words in the attribute word library respectively; assuming that the matched attribute word is "material→null", the "material" is taken as the attribute word of the target object. The finally-generated query keyword prompt information is "guess you ask for a material of the mobile phone case".

The present disclosure does not limit a specific way of presenting the query keyword prompt information. Exemplarily, the query keyword prompt information is presented in form of a control or an interface entry.

The present disclosure does not limit a specific position for presenting the query keyword prompt information. Exemplarily, the position for presenting the query keyword prompt information is adjacent to the information input area. Further, in one embodiment, the information flow area and the information input area are arranged vertically; the information flow area includes a comment area; the position for presenting the query keyword prompt information is located at the end presenting position in the information flow area, and the position for presenting the query keyword prompt information is adjacent to the information input area.

Exemplarily, further referring to FIG. 2, the information flow area is used to present live-streaming video. The information flow area and the information input area are arranged vertically, and the information input area is located below the information flow area. A comment area is provided in at a lower left corner of the information flow area. The position for presenting the keyword prompt information is located below the comment area and adjacent to the information input area.

Since the user's attention is usually focused near the information input area while the user is editing the input information, setting the position for presenting the query keyword prompt information adjacent to the information input area may enable the query keyword prompt information to be located within the user's viewing range so that the query keyword prompt information may be noticed by the user.

At S130, in response to a triggering operation on the query keyword prompt information, query result content is presented.

The triggering operation on the query keyword prompt information may specifically include a click operation or a slide operation on the query keyword prompt information, etc.

The query result content corresponds to the query keyword prompt information, and is an answer to a query question reflected by the query keyword prompt information.

As will be appreciated by those skilled in the art, in a case that the user performs the triggering operation on the query keyword prompt information, it is often meant that the content described by the query keyword prompt information is consistent with the user's intent.

There are various specific implementation methods for presenting the query result content, which will not be limited by the present disclosure. Exemplarily, the query result content may be presented in a pop-up window, or a query result presentation interface is presented, and the query result presentation interface includes the query result content.

In the above-mentioned technical solution, in a case that input information to be released is detected in the information input area and the input information satisfies the preset condition, the query keyword prompt information is presented; and in response to the triggering operation on the query keyword prompt information, the query result content is presented. This is substantially meant that the input information is automatically identified, during the editing of the input information by the user, the input information is converted into the query keyword prompt information for presentation, and in a case that the query keyword prompt information is triggered by the user, the query result content corresponding to the query keyword prompt information is directly presented, so as to assist the user in quickly obtaining the query result thereof.

In the live-streaming scenario, in a case that the users are active in the live-streaming room, the anchor usually cannot reply to the questions in the comment area in time. By using the above-mentioned technical solution, on the one hand, in a case where the input information is not released, the above-mentioned technical solution may help the viewing user to get the answer to the question raised by them, and improve a rate at which the viewing user obtains the query result. On the other hand, since the user has obtained the query result before the releasing, the query needn't be continued, which may effectively reduce the number of pieces of comment information in the comment area, and reduce the number of questions that the anchor needs to answer, so that the anchor can introduce the object more attentively and continuously, and improve the viewing experience of other viewing users.

On the basis of the above-mentioned technical solutions, optionally, the target interface corresponds to a number of candidate objects. For example, it may be meant by "target interface corresponds to a number of candidate objects" that what is presented to the user via the target interface is a candidate object corresponding to the target interface. In an E-commerce scenario, in a case that the target interface is a preview flow interface in a live-streaming room or a presentation interface of the live-streaming room, the candidate object corresponding to the target interface is a commodity sold in the live-streaming room.

In a case that the target interface corresponds to a number of candidate objects, the input information is used for querying related information of the target object, in practice, it may occur that the candidate objects include the target object or that the candidate objects do not include the target object.

In one embodiment, it may be configured that the query result presentation interface may be presented in response to the triggering operation on the query keyword prompt information regardless of whether the candidate objects include the target object. In a case that the candidate objects include the target object, exemplarily, with reference to FIG. 3, the query result presentation interface includes the query result content, and the query result content includes summary information of the target object; and the target object is an object queried for in the input information. In a case that the candidate objects do not include the target object, the query result presentation interface includes the query result content, and the query result content includes prompt information for prompting that a query result corresponding to the query keyword prompt information is not found.

The summary information of the target object may be, for example, a set composed of partial attribute information of the target object. The summary information of the target object is used to briefly present an overview of the target object to the user in the form of a text and/or image. In the E-commerce scenario, the summary information of the target object may be understood as a commodity card.

Optionally, the summary information of the target object also has a jump function. When the user performs a triggering operation on the summary information of the target object, an order-placing interface corresponding to the target object may be presented. The order-placing interface includes a target object details interface, a specification attribute selection interface for the target object, or an order confirmation interface for the target object. The target object details interface includes all attribute information of the target object. The specification attribute selection interface for the target object and the order confirmation interface for the target object will be described in detail later, and will not be described here any more in detail.

In a case that the candidate objects include the target object, the query result presentation interface includes the query result content, and the query result content includes the summary information of the target object. This is in essence taking the summary information of the target object as a query result corresponding to query keyword prompt information, and limiting to search for the target object in the candidate objects.

Figure 3:
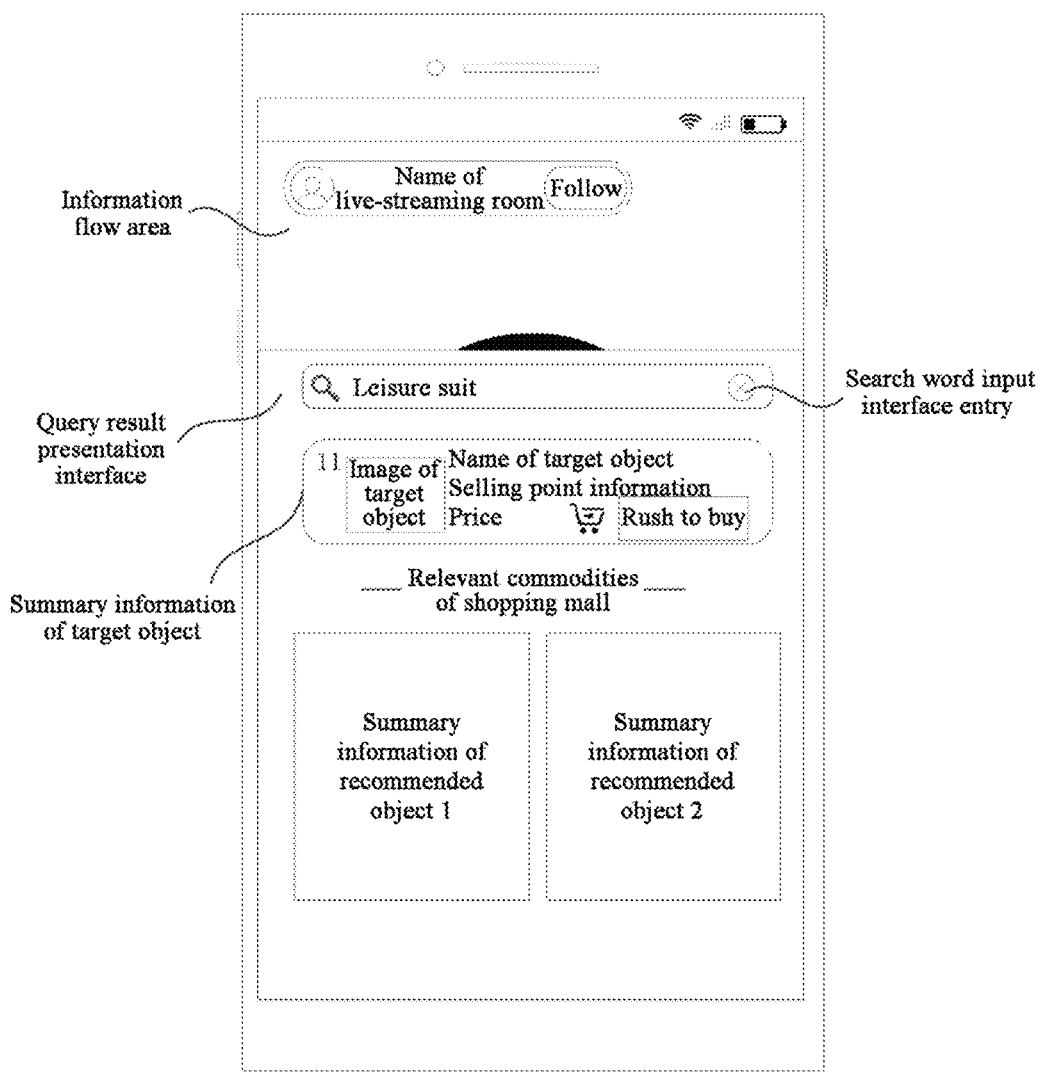
Figure 4:
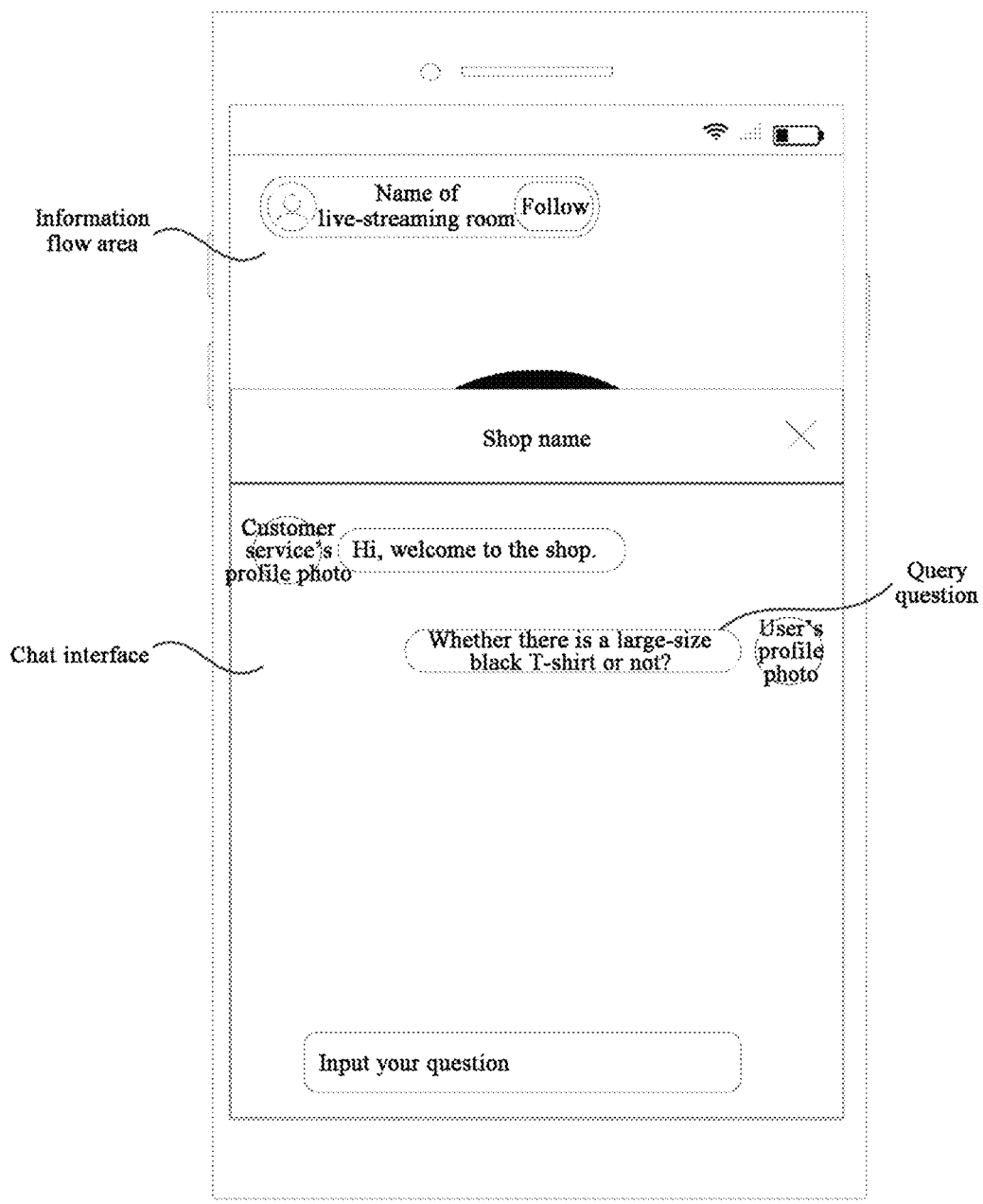

In another embodiment, it may be configured that in response to the triggering operation on the query keyword prompt information, in a case that the candidate objects include the target object, the query result presentation interface is displayed as show in FIG. 3. The query result presentation interface includes the summary information of the target object, and the summary information of the target object is the query result content; in a case that the candidate objects do not include the target object, a chat interface is presented as shown in FIG. 4. The chat interface includes a query question which is obtained according to the input information.

The chat interface refers to an interface for communicating with the customer service personnel, and the query question may be, for example, chat content sent by the terminal to the terminal held by the customer service personnel, wherein the chat content is used for querying related information of the target object.

The query question is obtained according to the input information, and for example, the input information may be directly sent to the customer service personnel as the query question, or the input information may be translated and then sent to the customer service personnel as the query question. Exemplarily, in a case that the input information is "is there a large-size black T-shirt?", it is translated to obtain the query question "whether there is a large-size black T-shirt or not?" as shown in FIG. 4. The goal of translation is to make query question more smooth and complete.

It needs to be appreciated that information supplementation may be required during the translation. Exemplarily, in a case that the input information is "is there a large-size" and the input information lacks a target object identifier, information supplementation needs to be performed during the translation process, so that the query information includes the target object identifier. This may facilitate the customer service personnel to understand the question asked by the user.

When the supplementation is performed, the target time period may be determined according to the time when input information to be released is detected in the information input area; and the input information is supplemented based on the content presented in the information flow area in the target time period.

In a case that the candidate objects do not include the target object, the chat interface is presented. This is substantially meant that in the case where the target object is not found from the candidate objects, by setting that the chat interface is presented, the customer service personnel is to answer the question asked by the user.

On the basis of the above-mentioned technical solutions, optionally, in a case that the input information is used for querying the target attribute information of the target object, the query keyword prompt information includes a target attribute word of the target object. The query result content further includes target attribute information of the target object. In the query result presentation interface, the position for presenting the summary information of the target object is before the position for presenting the target object attribute information.

Exemplarily, the target attribute information, as the attribute that the user wishes to understand and ask, is obtained by semantic understanding of the input information.

Figure 5:
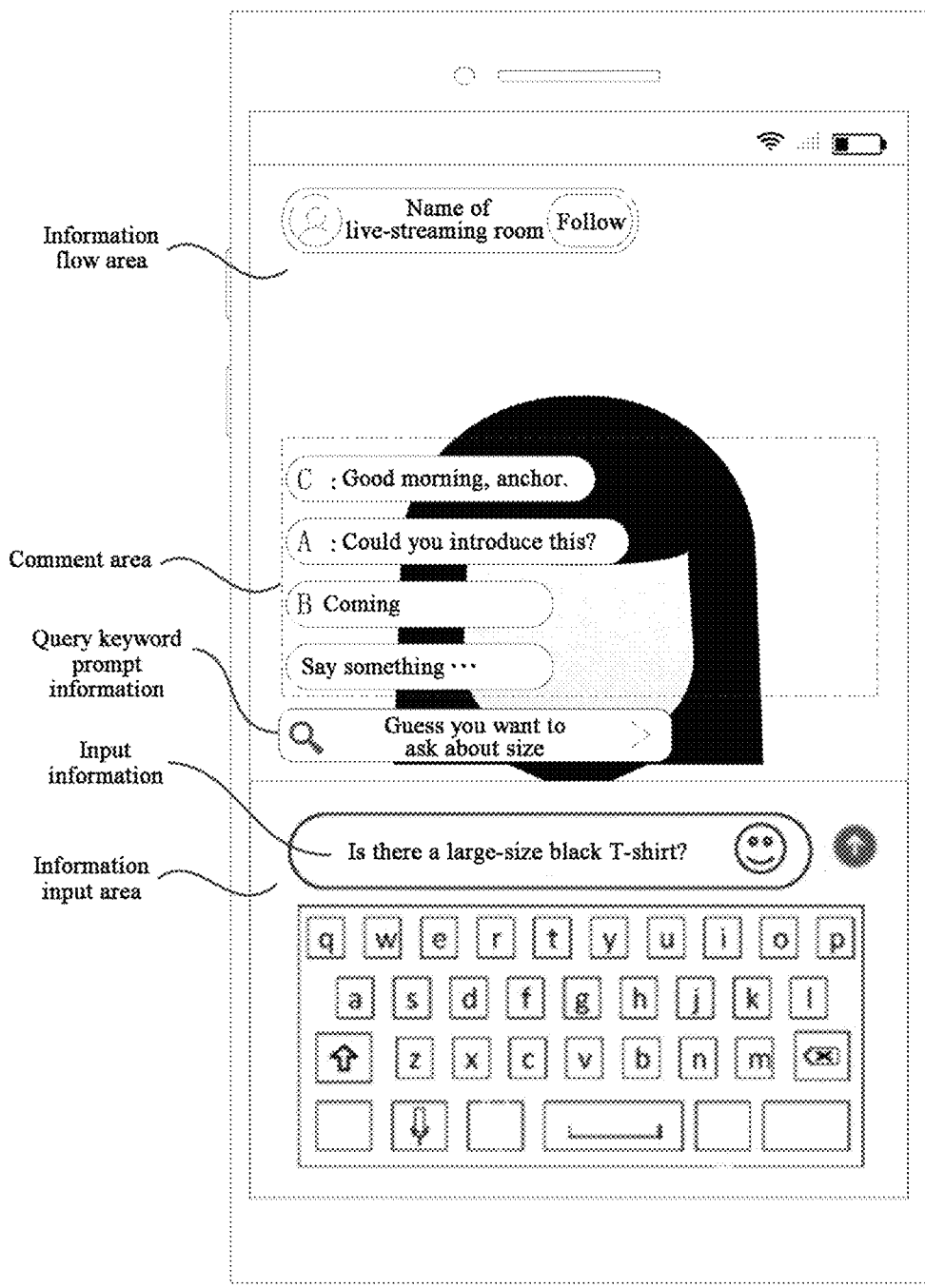
Figure 6:
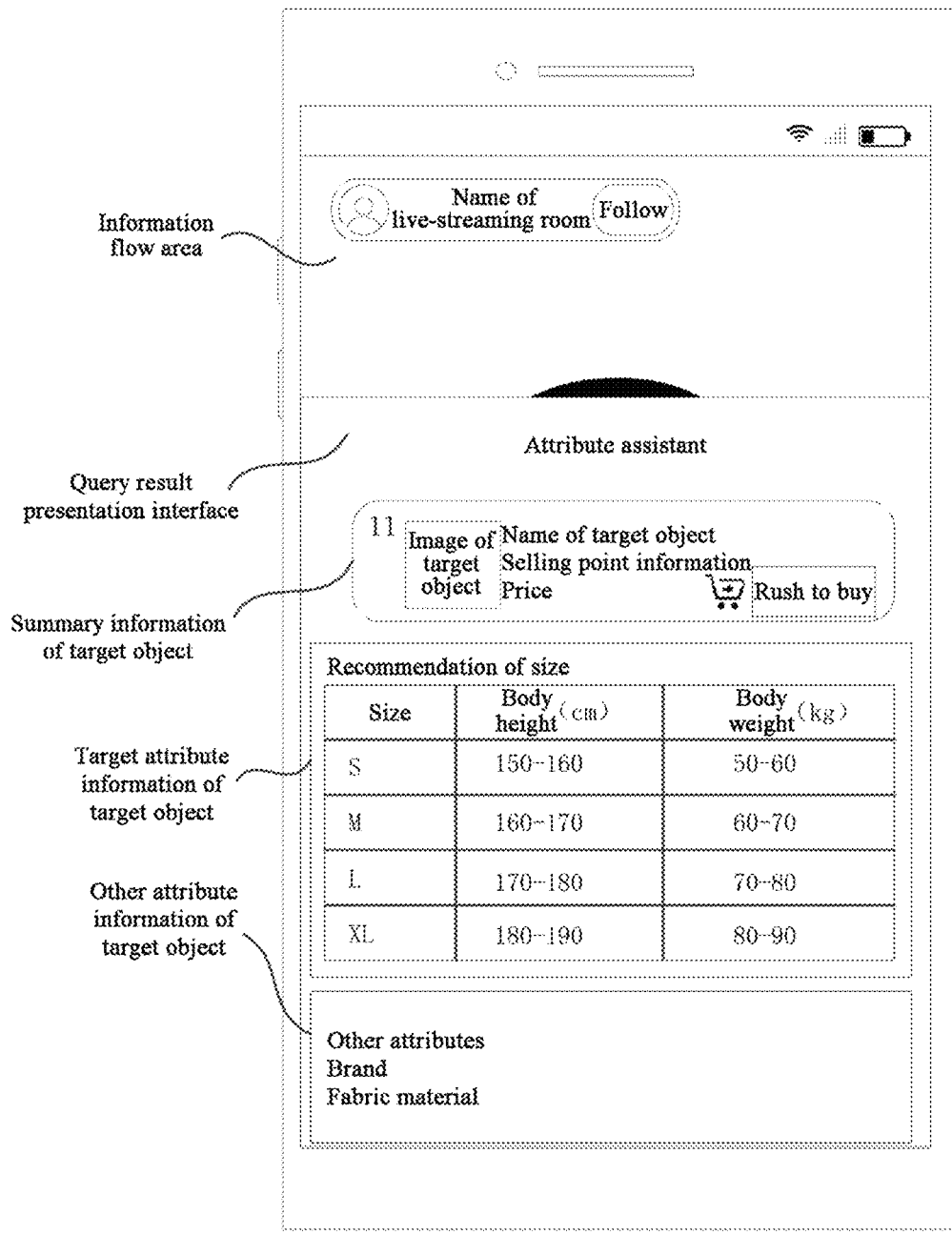

Exemplarily, referring to FIG. 5, the input information is "is there a large-size black T-shirt?", it may be obtained according to the input information that the target object is a black T-shirt and the target attribute is a size. Therefore, the query keyword prompt information is set to "guess you want to ask about the size". When the user clicks the keyword prompt information, the query result presentation interface includes a commodity card of a black T-shirt (namely, the target object summary information) and a size table of the black T-shirt (namely, the target attribute information of the target object), as shown in FIG. 6. The commodity card of the black T-shirt and the size table of the black T-shirt are both the query result content. The position for presenting the commodity card of the black T-shirt is located before the position for presenting the size table of the black T-shirt.

Setting the query result content to further include target attribute information of the target object is substantially transparently transmitting the target attribute information of the target object to the query result presentation interface, so that the user may directly view the target attribute information of the target object, and the number of operations of the user for obtaining a specific answer to the query question may be sufficiently reduced, and the query rate may be improved.

Furthermore, the query result presentation interface further includes other attribute information of the target object. The position for presenting the target object target attribute information is before the position for presenting the other attribute information.

The other attribute information of the target object is other attributes possessed by the target attribute in addition to the target attribute. The content specifically designated by the other attribute information is not limited in the present disclosure.

On the basis of the above-mentioned technical solutions, in one embodiment, optionally, the query result presentation interface further includes an order-placing option and an add-to-cart option corresponding to the target object, and the summary information of the target object further includes all specification attribute information of the target object. The method further includes: in a case that at least one piece of specification attribute information is in a selected state, in response to a triggering operation on the order-placing option, presenting an order confirmation interface corresponding to the target object. Alternatively, in a case that at least one piece of specification attribute information is in the selected state, in response to a triggering operation on the add-to-cart option, the target object corresponding to the specification attribute information in the selected state is added into a set of to-be-ordered objects.

The specification attribute information is one or more of the attributes of the target object, and a minimum Stock Keeping Unit (SKU) may be defined by selecting the specification attribute information. The minimum Stock Keeping Unit (SKU) is a basic unit for measuring the quantity of stock in and out. The minimum Stock Keeping Unit is a minimum unit that defines a commodity, and determined by a combination of attributes of the commodity. For example, a garment has a plurality of specification attributes, such as size, or color, etc. that may be selected by the user. Assuming that there are three choices for each of the garment size and color, the garment has nine (3×3=9) minimum stock keeping units. Each minimum stock keeping unit has a unique code. The code aims to distinguish and record information of different attribute combinations. In other words, a target object may include one or more type of specification attribute information, and one or more mini- mum stock keeping units may be obtained by combining the one or more type of specification attribute information.

Exemplarily, the specification attribute information includes at least one of: size, style, material and color. The target object corresponding to the specification attribute information in the selected state is a minimum stock keeping unit.

In practice, when the summary information corresponding to the target object includes multiple pieces of specification attribute information of the target object, the multiple pieces of specification attribute information may be specification attribute information of the same class or specification attribute information of different classes.

Figure 7:
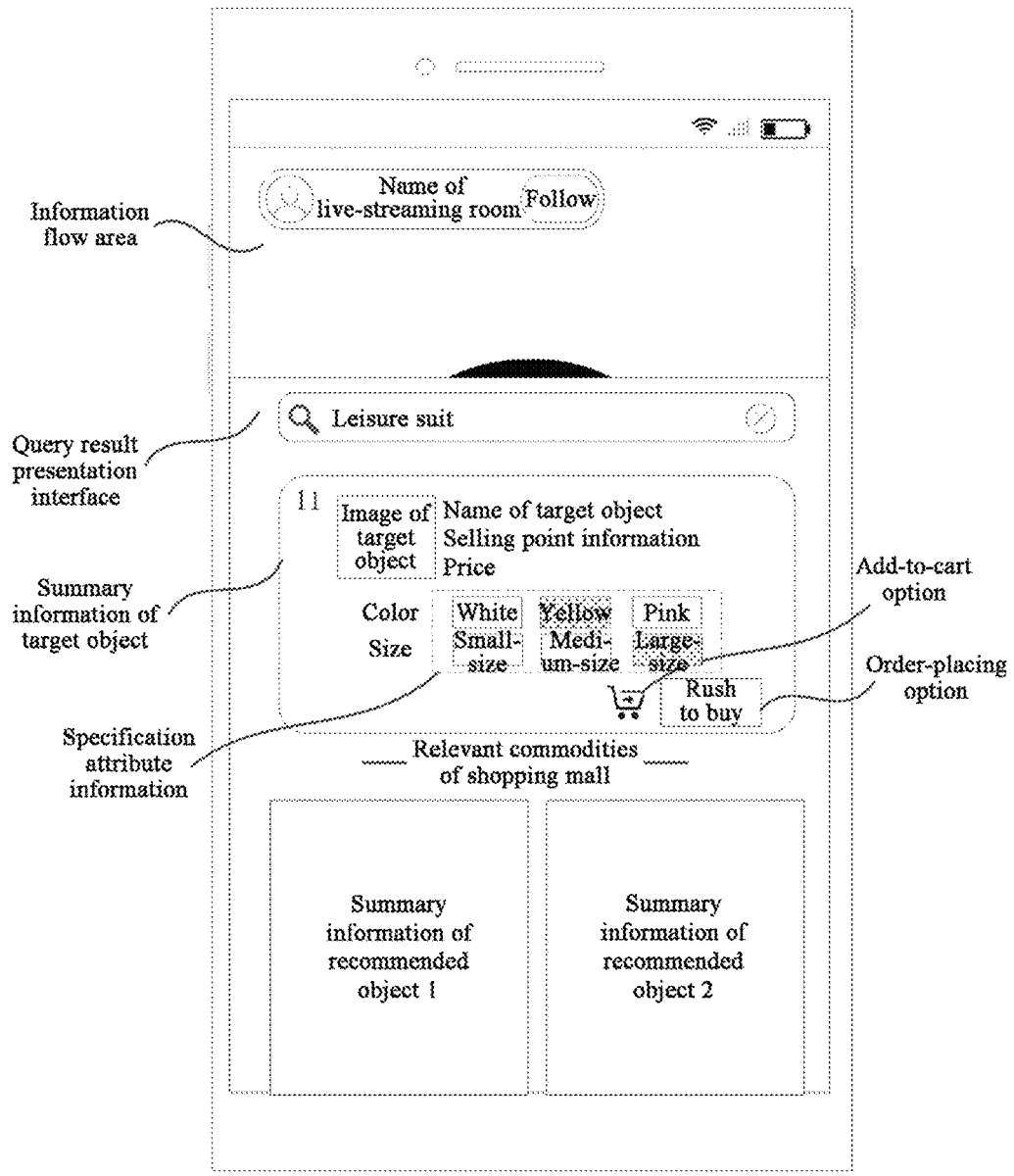

Exemplarily, in FIG. 7, the query result presentation interface includes summary information of the target object. The summary information includes all the specification attribute information of the target object, and the specification attribute information may be classified into two classes, one is about color and the other is about size. The specification attribute information belonging to the class of color is located in a first row, and the specification attribute information belonging to the class of size is located in a second row.

The specification attribute information being in a selected state means that the specification attribute information is selected. Subsequently, whether being ordered or add-to-cart, the object concerned is the target object corresponding to the specification attribute information in the selected state. In practice, a piece of specification attribute information may be set in the selected state according to a default selection rule, or a piece of specification attribute information may be set in the selected state in response to the user's operation of selecting the specification attribute information (specifically including but not limited to a click operation and a slide operation).

The order-placing option is an option specifically designed for the target object for quick purchase of the target object. The triggering operation on the order-placing option may be, for example, a click or slide operation of the order-placing option. The trigger of the order-placing option by the user may indicate that the user wishes to buy the target object corresponding to the specification attribute information in the selected state.

Figure 8:
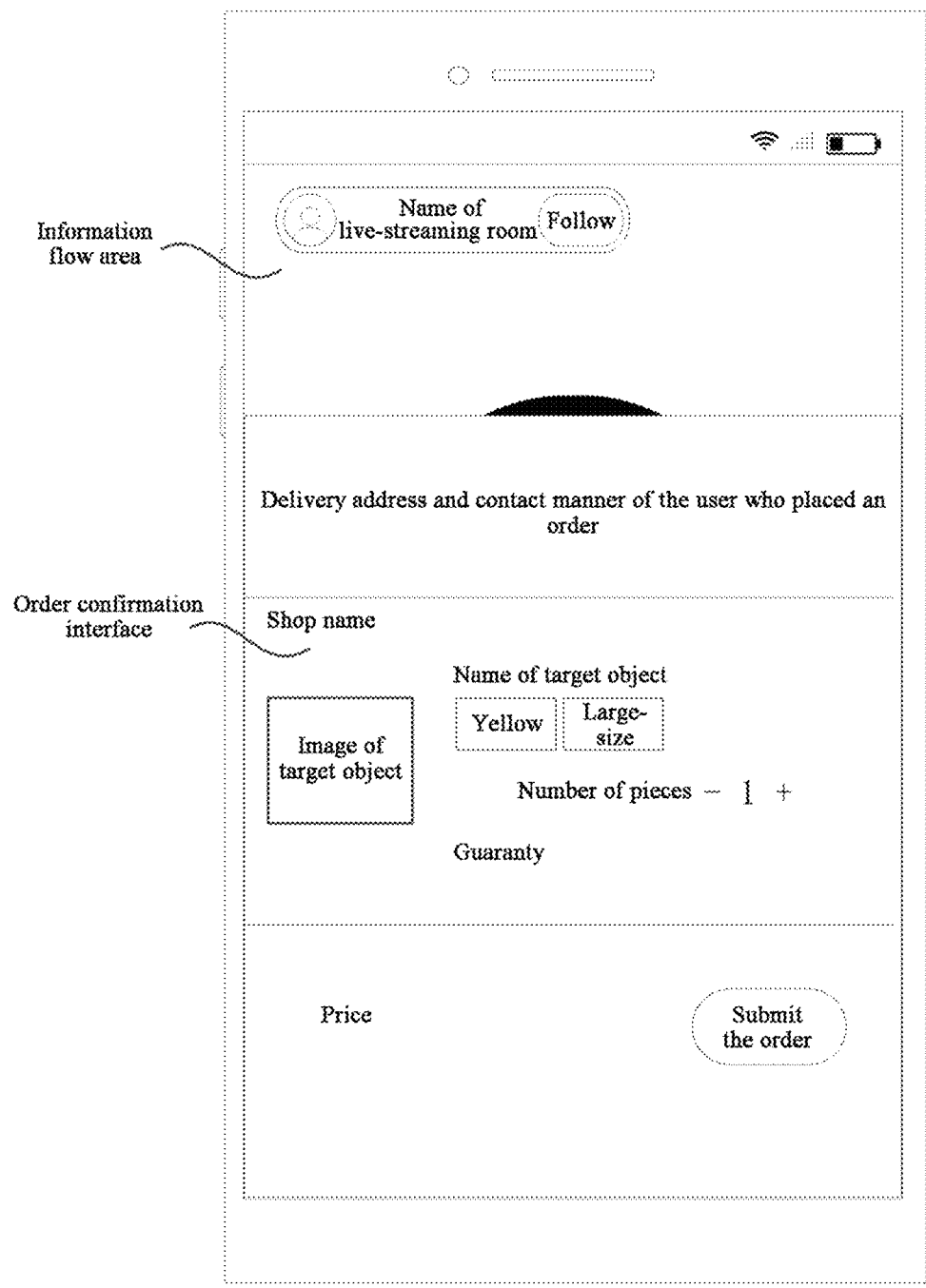
Figure 9:
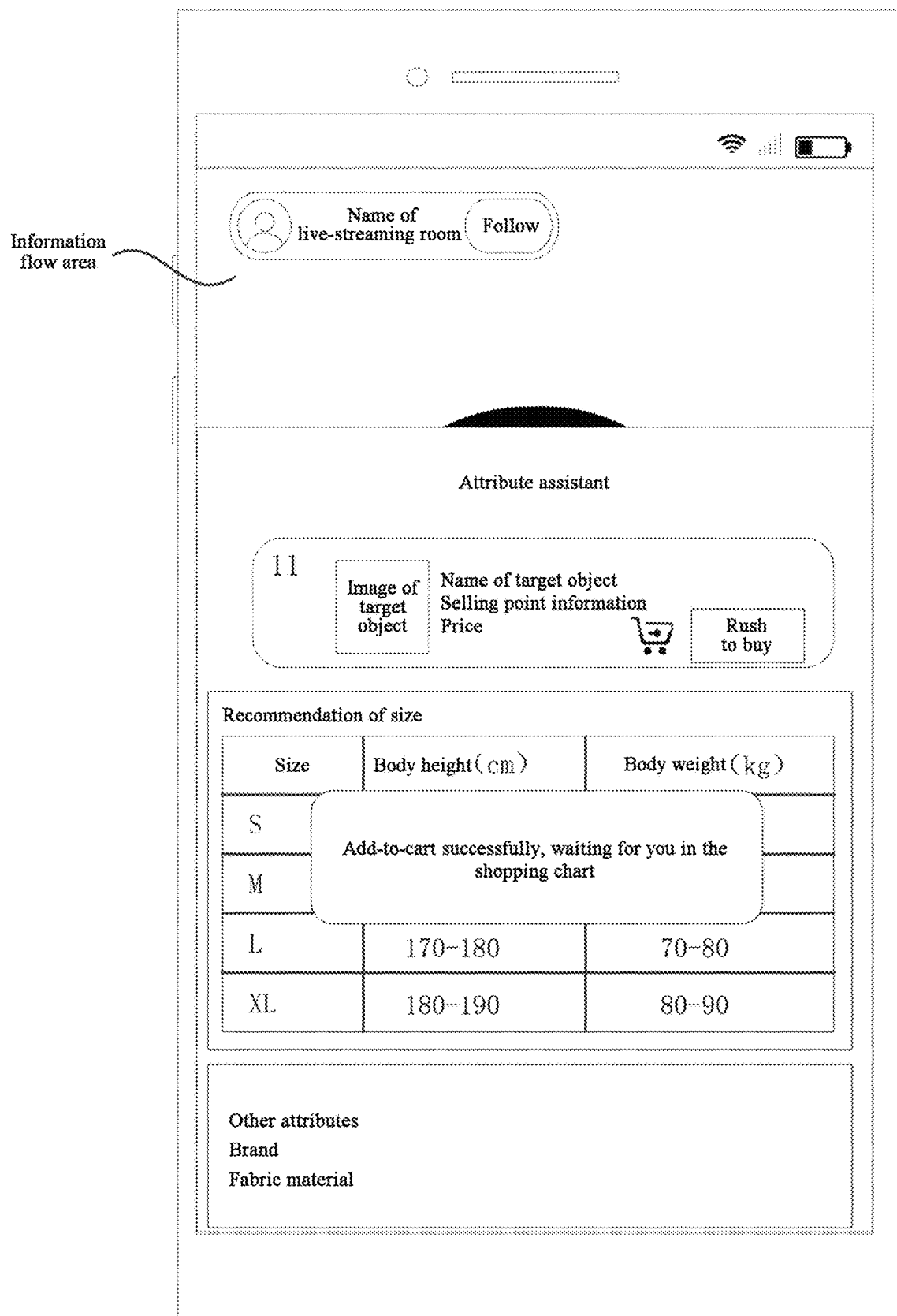

The order confirmation interface refers to an interface for presenting all the specification attribute information of the target object in the selected state together to the user, and the order confirmation interface is an interface for confirming information with the user for the last time before placing the order. After presenting the order confirmation interface, the terminal will enter a step of guiding the user to pay for the order. Exemplarily, referring to FIG. 8, the order confirmation interface presents all of the specification attribute information in the selected state.

The summary information of the target object further includes all the specification attribute information of the target object; in a case that at least one piece of the specification attribute information is in the selected state, an order confirmation interface corresponding to the target object is presented in response to a triggering operation on the order-placing option. This is substantively transparently transmitting the specification attribute information of the target object to the query result presentation interface, so that the user may directly select the specification attribute information of the target object from the query result presentation interface without going through the target object details interface, which may simplify the step of placing an order to buy the target object and shorten the time spent in placing the order.

The set of to-be-ordered objects may be, for example, a shopping cart.

The add-to-cart option is an option specifically designed for the target object for quickly adding the target object to the set of to-be-ordered objects.

The triggering operation on the add-to-cart option may be, for example, a click or slide operation on the add-to-cart option. It is possible to directly select the specification attribute information of the target object and add-to-cart without passing through the target object details interface, and reduce the time spent in the operation of adding to the shopping cart by setting as follows: the summary information of the target object further includes all the specification attribute information of the target object; in a case that at least one piece of the specification attribute information is in the selected state, in response to the operation of triggering the add-to-cart option, the target object corresponding to the specification attribute information in the selected state is added to the set of to-be-ordered objects.

Furthermore, add-to-cart success prompt information is presented after the minimum stock keeping unit defined by the specification attribute information in the selected state is added to the set of to-be-ordered objects.

Exemplarily, after adding the target object corresponding to the specification attribute information in the selected state to the set of to-be-ordered objects, the terminal again presents a query result presentation interface and the add-to-cart success prompt information. The add-to-cart success prompt information is "add-to-cart successfully, waiting for you in the shopping chart".

In another embodiment, optionally, the query result presentation interface further includes an order-placing option and an add-to-cart option corresponding to the target object, the method further including: in response to a triggering operation on the order-placing option or the add-to-cart option, presenting a specification attribute selection interface. The specification attribute selection interface includes all specification attribute information of the target object.

The specification attribute selection interface is used for aggregating and presenting all the specification attribute information of the target object. In the specification attribute selection interface, the user may select the specification attribute information, and the selected specification attribute information will be switched from an unselected state to a selected state, so that the terminal knows which minimum stock keeping unit in the commodity the user wishes to buy.

Figure 10:
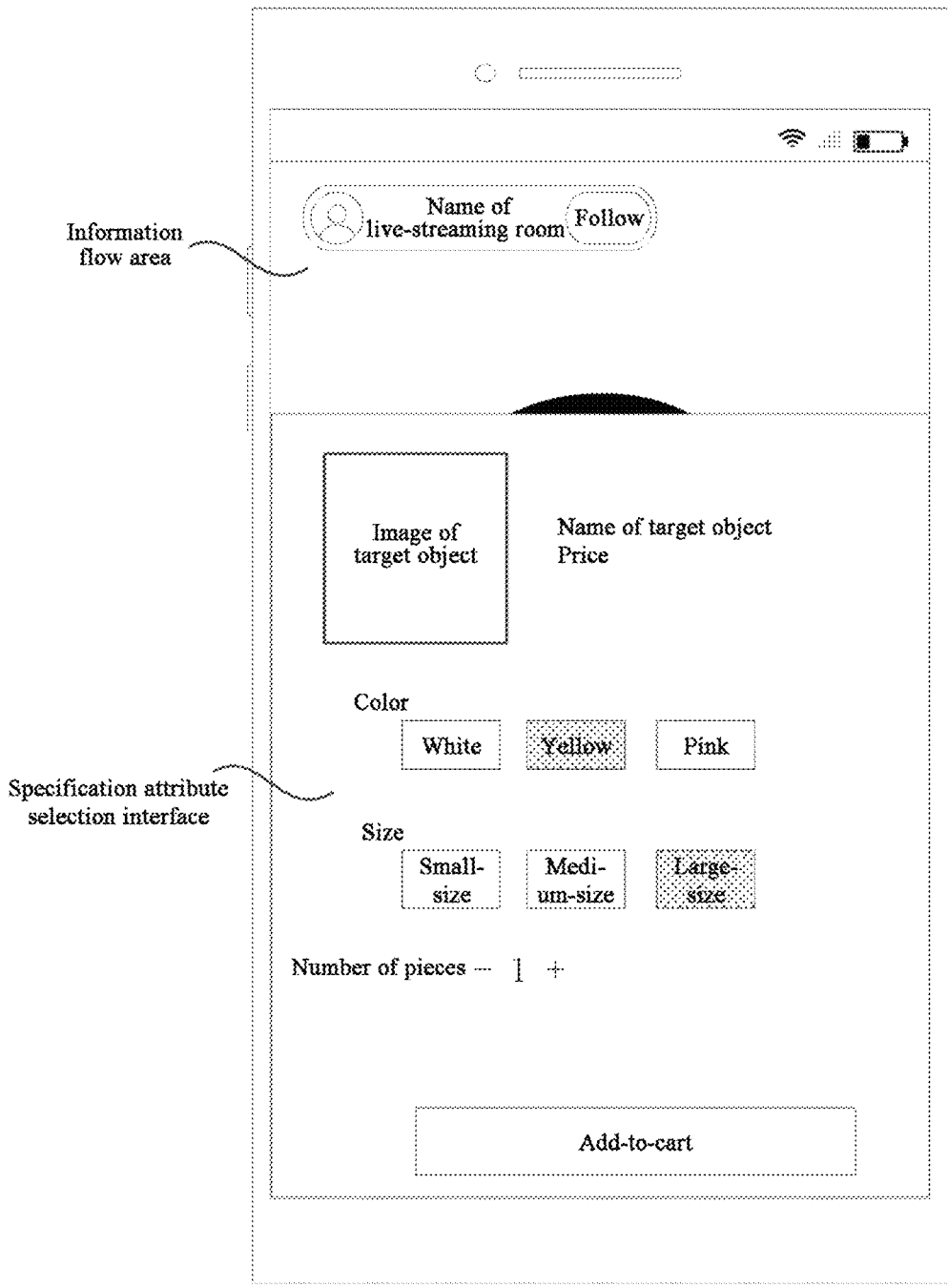

Exemplarily, referring to FIG. 10, the specification attribute selection interface presents all the specification attribute information of the target object, and the user may select the specification attribute information from the specification attribute selection interface.

It is possible to directly select the specification attribute without presenting the target object details interface, and reduce the time spent in the operation of placing an order or adding to the shopping cart by presenting the specification attribute selection interface in response to the triggering operation on the order-placing option or add-to-cart option.

On the basis of the above-mentioned technical solutions, optionally, the query result presentation interface further includes a recommended interface entry; and the method further includes: presenting a recommended interface in response to an operation of triggering the recommended interface entry.

The recommended interface may be any interface other than the target interface and the query result presentation interface, and the interface specifically referred to by the recommended interface is not limited in the present disclosure.

Exemplarily, the recommended interface may be a search word input interface. The search word input interface refers to an interface allowing the user to input the search word by himself.

Figure 11:
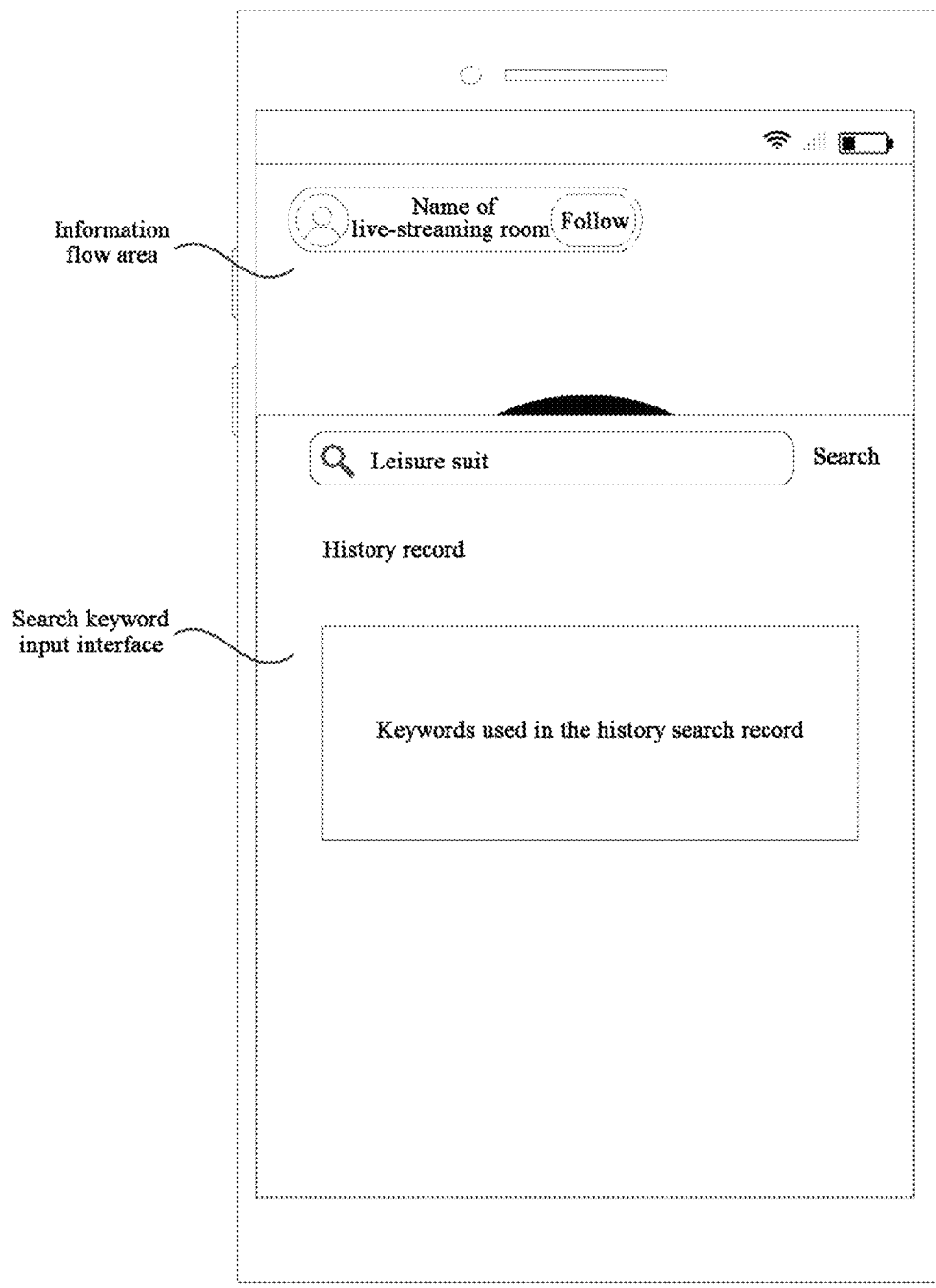

Exemplarily, when the user clicks on an search word input interface entry in FIG. 3, a search keyword input interface is presented as shown in FIG. 11.

In practice, there may be a case where the target object presented in the query result presentation interface does not comply with the user's demand, for this case, the recommended interface may be the search word input interface by setting, and a way for the user to search for information on his own according to his own demands may be provided to the user.

Exemplarily, the recommended interface may also be an attracting traffic interface. The attracting traffic interface, for example, may be an interface used to attract the user to access and search for information. In an E-commerce scenario, the attracting traffic interface may be an interface for attracting the user to view and purchase goods sold by an E-commerce platform. Exemplarily, the attracting traffic interface includes a mall home interface.

On the basis of the above-mentioned technical solutions, optionally, the query result presentation interface further includes summary information of a recommended object. Optionally, the position for presenting the summary information of the recommended object is located after the position for presenting the query result content. The recommended object may be an object having a correspondence relationship with the target interface or an object not having a correspondence relationship with the target interface. The recommended object and the target object may belong to objects of the same class, or objects of different classes. Exemplarily, the query result presentation interface includes summary information of the recommended object in FIG. 3.

It should be noted that while each of the foregoing method embodiments has been described as a combination of a series of acts for case of description, those skilled in the art should appreciate that the present invention is not limited by the sequence of acts described, because some steps may be performed in other sequences or concurrently with other steps according to the present disclosure. Secondly, those skilled in the art will also appreciate that the embodiments described in the description are preferred embodiments and that the acts and modules involved are not necessarily requisite for the present disclosure.

Figure 12:
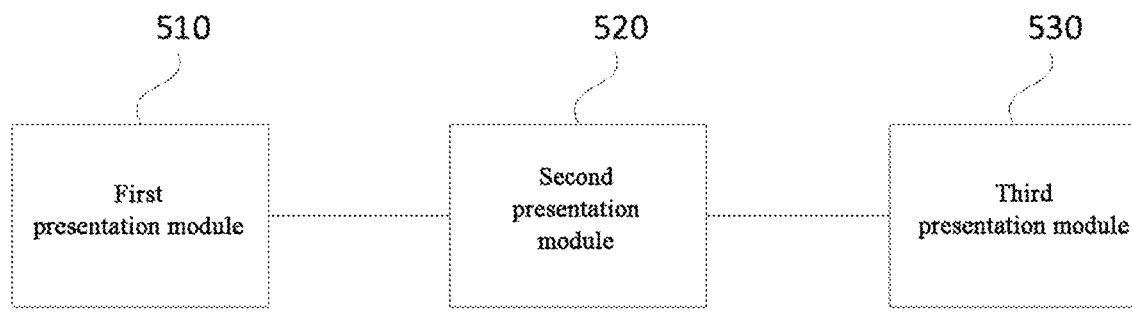
FIG. 12 is a structural schematic diagram of an apparatus for interaction according to an embodiment of the present disclosure.

FIG. 12 is a structural schematic diagram of an apparatus for interaction according to an embodiment of the present disclosure. The apparatus for interaction according to embodiments of the present disclosure may be configured in a client terminal. With reference to FIG. 12, the apparatus for interaction specifically includes: a first presentation module 510 configured to present a target interface including an information flow area and an information input area; a second presentation module 520 configured to in a case that input information to be released is detected in the information input area and the input information satisfies a preset condition, present query keyword prompt information; and a third presentation module 530 configured to, in response to a triggering operation on the query keyword prompt information, present query result content.

Furthermore, the query keyword prompt information is presented in form of a control or an interface entry.

A position for presenting the query keyword prompt information is adjacent to the information input area.

The preset condition includes the input information being used for indicating a need to query for related information of the target object.

The query keyword prompt information includes at least one of a query purpose prompt word, a target object identification word and a target object attribute word.

Furthermore, the second presentation module is configured to, in a case that the input information to be released is detected in the information input area and the input information satisfies a preset condition, obtain a first question constituent element based on the input information; determine a target time period according to a time when the input information to be released is detected in the information input area; obtain a second question constituent element based on content presented in the information flow area in the target time period; and generate and present the query keyword prompt information based on the first question constituent element and/or the second question constituent element.

Furthermore, the first question constituent element includes at least one of a query purpose, a target object and an attribute word; and the second question constituent element includes the target object.

Furthermore, the target interface corresponds to a number of candidate objects.

The third presentation module 530 is configured to, in response to a triggering operation on the query keyword prompt information, in a case that the candidate objects include the target object, present a query result presentation interface. The query result presentation interface includes the query result content, the query result content includes summary information of the target object, and the target object is an object queried for by the input information.

Furthermore, in a case that the input information is used for querying the target attribute information of the target object, the query keyword prompt information includes a target attribute word of the target object.

The query result content further includes target attribute information of the target object. In the query result presentation interface, a position for presenting the summary information of target object is before a position for presenting the target object attribute information.

Furthermore, the query result presentation interface further includes an order-placing option and an add-to-cart option corresponding to the target object, and the summary information of the target object further includes all the specification attribute information of the target object. The apparatus further includes a fourth presentation module configured to, in a case that at least one piece of the specification attribute information is in a selected state, in response to a triggering operation on the order-placing option, present an order confirmation interface corresponding to the target object; or in a case that at least one piece of the specification attribute information is in the selected state, in response a triggering operation on the add-to-cart option, add a target object corresponding to the specification attribute information in the selected state into a set of to-be-ordered objects.

Furthermore, the query result presentation interface further includes an order-placing option and an add-to-cart option corresponding to the target object, and the apparatus further includes a fourth presentation module configured to, in response to a triggering operation on the order-placing option or add-to-cart option, present a specification attribute selection interface. The specification attribute selection interface includes all specification attribute information of the target object.

Furthermore, the apparatus further includes a fifth presentation module configured to, in response to a triggering operation on the query keyword prompt information, in a case that the candidate objects do not include the target object, present a chat interface. The chat interface includes a query question obtained according to the input information.

Furthermore, the query result presentation interface further includes a recommended interface entry; and the apparatus further includes a sixth presentation module configured to, in response to a triggering operation on the recommended interface entry, present the recommended interface.

The apparatus for interaction according to the embodiments of the present disclosure may execute the steps executed by the client terminal or the server in the method for interaction according to the embodiments of the method of the present disclosure, and has the executed steps and advantageous effects, which will not be described in detail herein any more.

Figure 13:
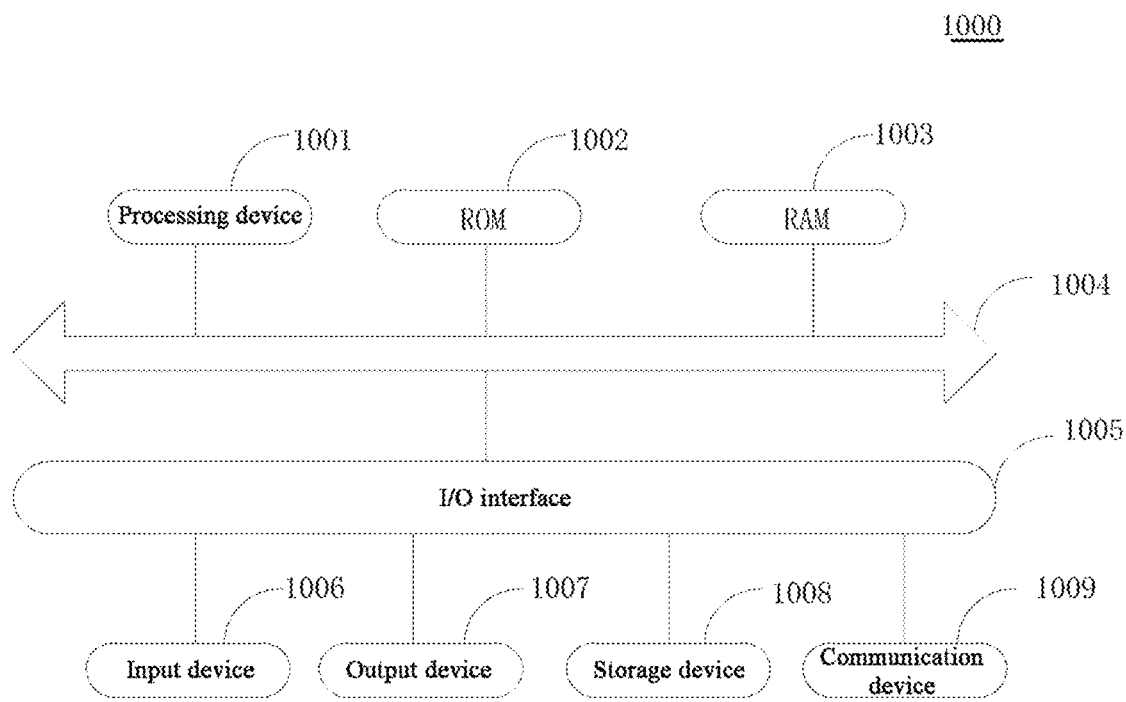
FIG. 13 is a structural schematic diagram of an electronic device according to an embodiment of the present disclosure.

FIG. 13 is a structural schematic diagram of an electronic device according to an embodiment of the present disclosure. Specific reference is made below to FIG. 13 which illustrates a structural schematic diagram of an electronic device 1000 suitable for implementing embodiments of the present disclosure. The electronic device 1000 in the embodiments of the present disclosure may include, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), or wearable devices etc. and fixed terminals such as digital TVs, desktop computers, intelligent household devices, etc. The electronic device shown in FIG. 13 is merely an example and should not impose any limitations on the functionality and scope of use of embodiments of the present disclosure.

As shown in FIG. 13 the electronic device 1000 may include a processing device (e.g., a central processing unit, a graph processor, etc.) 1001 that may perform various suitable acts and processes for implementing the method for interaction according to embodiments of the present disclosure, in accordance with a program stored in a Read Only Memory (ROM) 1002 or a program loaded from a storage device 1008 into a Random Access Memory (RAM) 1003. In the RAM 1003, various programs and data needed by the operation of the electronic device 1000 are also stored. The processing device 1001, the ROM 1002, and the RAM 1003 are connected to one another via a bus 1004. An input/output (I/O) interface 1005 is also coupled to bus 1004.

In general, the following devices may be connected to the I/O interface 1005: an input device 1006 including, for example, a touch screen, a touch pad, a keyboard, a mouse, a camera, a microphone, an accelerometer, or a gyroscope, etc.; an output device 1007 including, for example, a Liquid Crystal Display (LCD), a speaker, or a vibrator, etc.; a storage device 1008 including, for example, a magnetic tape, or a hard disk, etc.; and a communication device 1009. The communication device 1009 may allow the electronic device 1000 to communicate in a wireless or wired manner with other devices to exchange information. While FIG. 13 illustrates the electronic device 1000 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure include a computer program product including a computer program carried on a non-transitory computer-readable medium, the computer program includes program code for performing the method illustrated by the flow charts, thereby implementing the above method for interaction. In such embodiments, the computer program may be downloaded and installed from a network via the communication device 1009, or installed from the storage device 1008, or installed from the ROM 1002. When the computer program is executed by the processing device 1001, the above-described functions defined in the method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may include an information signal embodied in baseband or propagated as part of a carrier carrying computer-readable program code. Such propagated information signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the client and server may communicate using any currently known or future-developed network protocol, such as HTTP (HyperText Transfer Protocol), and may be interconnected with any form or medium of digital information communication (e.g., a communication network). Examples of the communication network include local area networks ("LANs"), wide area networks ("WANs"), the Internet, and peer-to-peer networks (e.g., ad hoc peer-to-peer networks), as well as any currently known or future-developed networks.

The computer readable medium may be contained in the above-described electronic device; and it may also be present separately and not installed into the electronic device.

The computer-readable medium carried thereon one or more programs which, when executed by the electronic device, cause the electronic device to: present a target interface which including an information flow area and an information input area; in a case that input information to be released is detected in the information input area and the input information satisfies a preset condition, present query keyword prompt information; and in response to a triggering operation on the query keyword prompt information, present query result content.

Optionally, when the one or more programs are executed by the electronic device, the electronic device may further perform the other steps of the above embodiments.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., connected through the Internet using an Internet service provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units described in connection with the embodiments disclosed herein may be implemented in a software or hardware manner. The names of the units do not constitute limitations of the units themselves in a certain case.

The functions described herein above may be performed, at least in part, by one or more hardware logic constituent elements. For example, without limitation, exemplary types of hardware logic constituent elements that may be used include: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combinations thereof. More specific examples of the machine-readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof. According to one or more embodiments of the present disclosure, the present disclosure provides an electronic device, including: one or more processors; and a memory configured to store one or more programs. The one or more programs, when executed by the one or more processors, cause the one or more processors to implement the method for interaction as described in embodiments of the present disclosure.

According to one or more embodiments of the present disclosure, the present disclosure provides a computer-readable storage medium stored thereon a computer program which, when executed by a processor, implements the above method for interaction according to the present disclosure.

Embodiments of the present disclosure further provide a computer program product including a computer program or instructions which, when executed by a processor, implements the method for interaction as described above.

It needs to be appreciated that relational terms such as "first", "second", and the like are only used to distinguish one entity or operation from another entity or operation without necessarily requiring or implying any such actual relationship or order between such entities or operations herein. Furthermore, the terms "comprises", "comprising", or any other variation thereof, are intended to cover a non-exclusive inclusion, such that a process, method, article, or apparatus that includes a list of elements does not only include those elements but also include other elements not expressly listed or include elements inherent to such process, method, article, or apparatus. Without more constraints, an element defined by the statement "comprise a . . . " does not preclude the existence of additional identical elements in the process, method, article, or apparatus that includes the element.

What are described above are only specific embodiments of the present disclosure, which enable those skilled in the art to understand or implement the present disclosure. Various modifications to these embodiments will be obvious to those skilled in the art, and general principles defined in the text may be implemented in other embodiments without departing from the spirit or scope of the present disclosure. Thus, the present disclosure will not be limited to these embodiments shown herein, and instead complies with the widest scope consistent with the principles and novel features disclosed in the text herein.

The invention claimed is:

1. A method for interaction, comprising:
presenting a target interface comprising an information flow area and an information input area;
in a case that input information to be released is detected in the information input area and the input information satisfies a preset condition, presenting query keyword prompt information; and
in response to a triggering operation on the query keyword prompt information, presenting query result content.

2. The method according to claim 1, wherein
the query keyword prompt information is presented in form of a control or an interface entry;
a position for presenting the query keyword prompt information is adjacent to the information input area;
the preset condition comprises the input information being used for indicating a need to query for related information of a target object; and
the query keyword prompt information comprises at least one of a query purpose prompt word, a target object identification word and a target object attribute word.

3. The method according to claim 1, wherein in the case that the input information to be released is detected in the information input area and the input information satisfies the preset condition, presenting the query keyword prompt information comprises:
in the case that the input information to be released is detected in the information input area and the input information satisfies the preset condition, obtaining a first question constituent element based on the input information;
determining a target time period according to a time when the input information to be released is detected in the information input area;
obtaining a second question constituent element based on content presented in the information flow area in the target time period; and
generating and presenting the query keyword prompt information based on the first question constituent element and/or the second question constituent element.

4. The method according to claim 3, wherein the first question constituent element comprises at least one of a query purpose, a target object and an attribute word; and the second question constituent element comprises a target object.

5. The method according to claim 1, wherein the target interface corresponds to a number of candidate objects; and in response to the triggering operation on the query keyword prompt information, presenting the query result content comprises:
in response to the triggering operation on the query keyword prompt information, in a case that the candidate objects comprise a target object, presenting a query result presentation interface, wherein the query result presentation interface comprises the query result content, the query result content comprises summary information of the target object, and the target object is an object queried for by the input information.

6. The method according to claim 5, wherein in a case that the input information is used for querying target attribute information of the target object, the query keyword prompt information comprises a target attribute word of the target object;
the query result content further comprises the target attribute information of the target object; and in the query result presentation interface, a position for presenting the summary information of the target object is in front of a position for presenting the target object attribute information.

7. The method according to claim 5, wherein the query result presentation interface further comprises an order-placing option and an add-to-cart option corresponding to the target object, and the summary information of the target object further comprises information about all specification attributes of the target object; and the method further comprises:

in a case that information about at least one of the specification attributes is in a selected state, in response to a triggering operation on the order-placing option, presenting an order confirmation interface corresponding to the target object; or in the case that information about at least one of the specification attributes is in the selected state, in response a triggering operation on the add-to-cart option, adding a target object corresponding to the information about the specification attribute in the selected state into a set of to-be-ordered objects.

8. The method according to claim 5, wherein the query result presentation interface further comprises an order-placing option and an add-to-cart option corresponding to the target object, and the method further comprises:

in response to a triggering operation on the order-placing option or the add-to-cart option, presenting a specification attribute selection interface, wherein the specification attribute selection interface comprises information about all specification attributes of the target object.

9. The method according to claim 5, further comprising:

in response to the triggering operation on the query keyword prompt information, in a case that the candidate objects do not comprise the target object, presenting a chat interface, wherein the chat interface comprises a query question obtained according to the input information.

10. The method according to claim 5, wherein the query result presentation interface further comprises a recommended interface entry; and the method further comprises:

in response to a triggering operation on the recommended interface entry, presenting a recommended interface.

11. An electronic device, comprising:

one or more processors; and a memory configured to store one or more programs, wherein the one or more processors are configured to, when execute the one or more programs:

present a target interface comprising an information flow area and an information input area;

in a case that input information to be released is detected in the information input area and the input information satisfies a preset condition, present query keyword prompt information; and in response to a triggering operation on the query keyword prompt information, present query result content.

12. The electronic device according to claim 11, wherein the query keyword prompt information is presented in form of a control or an interface entry;

a position for presenting the query keyword prompt information is adjacent to the information input area;

the preset condition comprises the input information being used for indicating a need to query for related information of a target object; and the query keyword prompt information comprises at least one of a query purpose prompt word, a target object identification word and a target object attribute word.

13. The electronic device according to claim 11, wherein the one or more processors are configured to:

in the case that the input information to be released is detected in the information input area and the input information satisfies the preset condition, obtain a first question constituent element based on the input information;

determine a target time period according to a time when the input information to be released is detected in the information input area;

obtain a second question constituent element based on content presented in the information flow area in the target time period; and generate and present the query keyword prompt information based on the first question constituent element and/or the second question constituent element.

14. The electronic device according to claim 13, wherein the first question constituent element comprises at least one of a query purpose, a target object and an attribute word; and the second question constituent element comprises a target object.

15. The electronic device according to claim 11, wherein the target interface corresponds to a number of candidate objects; and the one or more processors are configured to:

in response to the triggering operation on the query keyword prompt information, in a case that the candidate objects comprise a target object, present a query result presentation interface, wherein the query result presentation interface comprises the query result content, the query result content comprises summary information of the target object, and the target object is an object queried for by the input information.

16. The electronic device according to claim 15, wherein in a case that the input information is used for querying target attribute information of the target object, the query keyword prompt information comprises a target attribute word of the target object;

the query result content further comprises the target attribute information of the target object; and in the query result presentation interface, a position for presenting the summary information of the target object is in front of a position for presenting the target object attribute information.

17. The electronic device according to claim 15, wherein the query result presentation interface further comprises an order-placing option and an add-to-cart option corresponding to the target object, and the summary information of the target object further comprises information about all specification attributes of the target object; and the one or more processors are further configured to:

in a case that information about at least one of the specification attributes is in a selected state, in response to a triggering operation on the order-placing option, present an order confirmation interface corresponding to the target object; or in the case that information about at least one of the specification attributes is in the selected state, in response a triggering operation on the add-to-cart option, add a target object corresponding to the information about the specification attribute in the selected state into a set of to-be-ordered objects.

18. The electronic device according to claim 15, wherein the query result presentation interface further comprises an order-placing option and an add-to-cart option corresponding to the target object, and the one or more processors are further configured to:

in response to a triggering operation on the order-placing option or the add-to-cart option, present a specification attribute selection interface, wherein the specification attribute selection interface comprises information about all specification attributes of the target object.

19. The electronic device according to claim 15, the one or more processors are further configured to:

in response to the triggering operation on the query keyword prompt information, in a case that the candidate objects do not comprise the target object, present a chat interface, wherein the chat interface comprises a query question obtained according to the input information.

20. A non-transitory computer-readable storage medium storing a computer program thereon, wherein the program, when executed by a processor, causes the processor to:
present a target interface comprising an information flow area and an information input area;
in a case that input information to be released is detected in the information input area and the input information satisfies a preset condition, present query keyword prompt information; and
in response to a triggering operation on the query keyword prompt information, present query result content.

* * * * *